United States Patent
Gassong et al.

[11] 3,859,566
[45] Jan. 7, 1975

[54] ARRANGEMENT FOR REMOVING ENERGY FROM A SUPERCONDUCTING MAGNET

[75] Inventors: Siegfried Gassong; Dieter Kullmann, both of Erlangen, Germany

[73] Assignee: Siemens Aktiengesellschaft, Munich, Germany

[22] Filed: Nov. 21, 1973

[21] Appl. No.: 417,799

[30] Foreign Application Priority Data
Dec. 8, 1972 Germany............................ 2260231

[52] U.S. Cl. ................. 317/13 D, 317/54, 317/123, 335/216
[51] Int. Cl. ............................................. H02h 7/00
[58] Field of Search .................. 317/13 P, 54, 123; 335/216; 336/155

[56] References Cited
UNITED STATES PATENTS
| | | | |
|---|---|---|---|
| 3,466,504 | 9/1969 | Hart, Jr. ........................... | 317/123 X |
| 3,474,294 | 10/1969 | Weaver, Jr. et al. ............. | 317/13 D |
| 3,502,946 | 3/1970 | Kimura ............................. | 317/123 |

*Primary Examiner*—J. D. Miller
*Assistant Examiner*—Harry E. Moose, Jr.
*Attorney, Agent, or Firm*—Kenyon & Kenyon Reilly Carr & Chapin

[57] ABSTRACT

An arrangement for removing energy from a superconducting magnet system of the type having a plurality of series connected individual magnets each magnet having a plurality of resistors associated therewith for dissipating energy, in which a switch is associated with each magnet in the series circuit for disconnecting it from that circuit allowing each individual magnet to be separately de-energized without affecting other magnets thereby reducing the amount of additional coolant required in the system.

10 Claims, 1 Drawing Figure

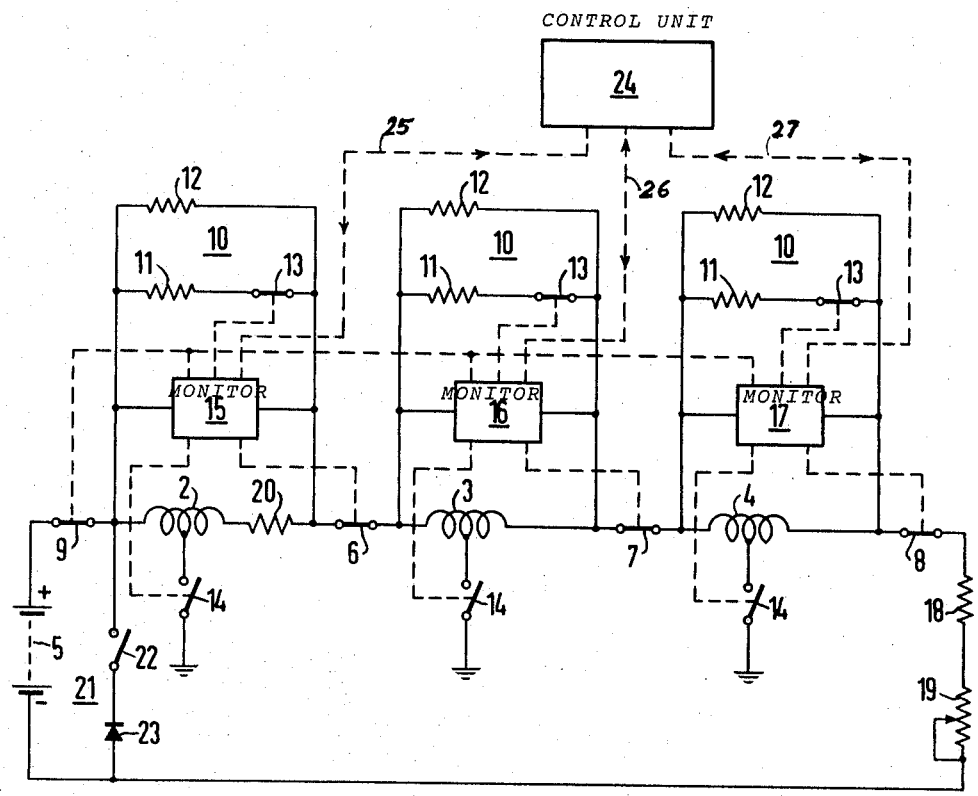

ARRANGEMENT FOR REMOVING ENERGY FROM A SUPERCONDUCTING MAGNET

BACKGROUND OF THE INVENTION

This invention relates to superconducting magnet systems in general and more particularly to an improved arrangement for removing energy from magnets in a superconducting magnet system having a plurality of series connected individual magnets.

Systems are known in which a plurality of superconducting magnets are coupled together in series. Commonly, magnets of this nature are arranged in toroidal and linear configurations. In such systems each magnet is provided with several resistors and a superconductivity monitoring device to permit removing the energy stored within the magnet coils should the coil go out of the superconductive state and into a state of normal conductance. When such normal conductance occurs, due to an accident or other cause, a danger of the superconductor overheating at the point of normal conductance results. This state is also referred to as a quench, which term will be used throughout the remainder of the specification. In a copper stabilized superconductor having, for example, a total cross-section of 4.7 sq. mm and a cross-sectional ratio of copper to superconducting material of 2.5, the temperature rise for a quench with an operating current which is initially 800 A and which slowly decays will be 400 K after three seconds, in the adiabatic case. With this rate of temperature rise, after approximately 10 seconds, the copper stabilized superconductor can reach a temperature at which it will melt. Thus, special steps must be taken to insure that the superconducting magnets in such a system are not destroyed if for some reason normal conductance occurs within the magnet. To accomplish this, the energy stored within the magnet must be quickly removed from the winding. In general, two methods of removal are possible. A first possibility is insuring through suitable measures that the major part of the magnetic energy is removed from the magnet and the cyrostat enclosing it and converted into heat in an external resistor. This arrangement permits the size of the magnet to remain relatively small and the coolant required within the magnet cyrostat remains limited. Fast removal of the energy from the magnet can be accomplished only if the external resistance is substantially higher than the internal resistance of the magnet during normal conductance. This in turn will result in high voltages at the magnet. These must be limited for safety reasons and therefore as high a resistance as might be desired to obtain the optimum energy dissipation cannot be used. A further possibility is in providing the magnet itself with closed normally conducting shunts through which a major portion of the magnet energy can be converted into heat to prevent local overheating of the superconductors themselves.

In each case, the power supply feeding the magnet is immediately disconnected as soon as a transision into the normal conducting state has been detected. This interruption must be as fast as possible, particularly for superconductors having a high current density.

An arrangement such as that described above having individual shunts is disclosed in U.S. Pat. No. 3,466,504. As shown therein, a superconducting magnet is sub-divided into a plurality of series connected sub-coils and the series circuit connected to an external power supply. A voltage limiter comprising semiconductor diodes is shunted across each sub-coil. This arrangement operates at the helium temperatures and is arranged in the side nearest that of the magnet. As long as the voltage drop across its respective sub-coil is very small, i.e., as long as the sub-coil is superconducting, the voltage limiter has a relatively high resistance and the corresponding coil is in a practical sense not shunted. However, upon transition to a normal conducting state within the sub-coil, its resistance increases substantially and along therewith the voltage drop increases. Above a preadjusted threshold value of voltage, the voltage limiter switches over to a conducting state shunting the portion of the superconductor which has become normally conducting. This will induce additional currents into the remaining sub-coils and cause a rapid-transition of the entire magnet into a normal conducting state. As soon as the voltage across the individual sub-coil falls below the threshold, indicating that the coils are again superconducting, the individual voltage limiters return to their high impedance state and the operating current of the power supply flows through only the sub-coils.

In this system then, if normal conduction occurs in one of the sub-coils of the superconducting magnet the voltage limiters insure that the entire magnet becomes normal conducting as quickly as possible with the sub-coil in question being protected from destruction through overheating. The result of this is that the entire magnet becomes heated during the process and therefor must be rocooled. Such cooling requires large quantities of coolant in order to again reach the superconducting temperature.

Thus, there is a need for a system which will operate as quickly as the above described system but do so without requiring the large amounts of coolant for recooling to the superconducting state.

SUMMARY OF THE INVENTION

The present invention provides an improved arrangement for quickly removing energy from the sub-coils or individual coils of a superconducting magnet system of the type described above. It does this without requiring large amounts of coolant for recooling and at the same time limits the voltage occuring at the sub-coil during the removal of energy.

The essential element of the present invention is the inclusion of an individual switch in each line coupling two magnets of the plurality in series. This permits each individual magnet to be separately de-energized while isolated from adjacent magnets. The system of the present invention is particularly useful in a type of installation where the individual magnets are arranged in a toroid. During normal operation, essentially no forces are present in a longitudinal direction of the system parallel to the core of the toroid. Only in the case of a failure or quench of one of the individual magnets will large magnetic forces appear in this direction due to an asymetrical field distribution which will then be present. Through the present arrangement, all individual magnets are simultaneously de-energized and magnetic energy coupled out of these magnets fast enough so that the stress due to forces between individual magnets remains relatively low and is present for only a short period of time. In addition, superconductive operating temperatures are maintained in those individual magnets which have remained superconducting thereby alliviating the need for additional coolant. Only the magnet or magnets which have become normal conducting need be cooled down again.

A further refinement of the invention resides in the provision of a grounding switch for each individual magnet, the grounding switch being located either at the center or one end of the magnet. This permits fixing the potential values between the terminals of each individual magnet after all individual magnets have been mutually electrically decoupled. In addition, sparking in the system, which can result from static charges for example, can be prevented.

Each individual magnet has a shunt formed by one or more resistors, the resistance of which shunt can be varied by means of a switch. This arrangement is particularly advantageous in that de-energization of the individual magnets, through the use of suitable resistance values, is speeded to such a degree that the peak values of the asymetrical forces which develop in the axial direction of the magnet system occurs only briefly.

In the preferred embodiment, the resistance values are chosen so that a high resistance can be provided which is smaller than or equal to the ratio of the maximum permissible voltage at the individual magnet to its operating current. A low resistance is provided which will preferably have a value which is smaller than or equal to the $(n-1)$th part of the high resistance where $n$ is the number of individual magnets in the magnet system. The voltage across the switch contacts of the operating switch disconnecting the power supply can thus be limited to a nominal value of the low resistance. In similar manner, the voltage at the individual magnet can be limited to a maximum value by the high resistors. Through these provisions, despite the fast deenergization, flash over is prevented.

BRIEF DESCRIPTION OF THE DRAWINGS

The single FIGURE is a circuit-block diagram of the system of the present invention.

DETAILED DESCRIPTION OF THE PREFERRED EMBODIMENT

The FIGURE illustrates a magnet system of the type described above having the de-energizing arrangement of the present invention attached thereto. Such a system will comprise a plurality of individual magnets. For purposes of simplicity, only three individual magnets designated 2, 3 and 4 have been shown on the FIGURE although large pluralities will normally be used. In conventional fashion, each of the individual magnets 2, 3 and 4 will be placed in a separate cyrostat with its electrical leads brought out of the cyrostat and at a normal temperature. The individual magnets are coupled to each other through switches. Thus, the magnets 2 and 3 are coupled through a switch 6 and the magnets 3 and 4 through a switch 7. The power supply 5 supplying power to the series connected magnets is coupled through a switch 9 to the magnet 2 and through a switch 8 to the magnet 4. Each of the individual magnets has a shunt across it designated generally as 10.

In the preferred embodiment of the present invention, each shunt comprises a low resistance resistor 11 and a high resistance resistor 12. The resistors 11 and 12 are coupled in parallel with a switch 13 being provided to connect and disconnect the resistor 11. Also shown for each of the magnets 2, 3 and 4 is a switch 14 which when closed couples the center tap of the magnet to ground. Furthermore, each magnet has associated with it a superconductivity monitoring device. The monitoring device for magnet 2 is designated by 15, that for magnet 3 by 16 and that for magnet 4 by 17. These monitoring devices are connected to the cold terminals of the superconducting magnet and monitor the voltage drop across the magnet. Such monitoring may be done through the use of diodes such as those used in prior art devices described above. Each of the monitoring devices 15, 16 and 17 are coupled to a control unit 24. As with all of the control functions of the present invention these are shown on the FIGURE as dotted lines.

The total resistance of all current carrying members of the system including the leads to and from the magnet system is represented by the resistance 18 between the power supply 5 and the magnet 4. Connected in series therewith is a variable resistor 19 which can be used for controlling the de-energizing time constant of the superconducting magnet system.

Assume that the total system is in a state of superconductance. Current will flow through each of the individual magnets 2, 3 and 4 since in this state their resistance is much lower than that of the shunt resistors 11 and 12. Switches 6, 7, 8 and 9 will remain in a closed position since the monitors 15, 16 and 17 are detecting a proper voltage drop across each of the individual coils. Assume that while in this state, something occurs causing a quench in the individual magnet 2. This will result, in well known fashion, in a rapid increase of the resistance across the magnet 2 as it goes into normal conductance. This normal resistance is shown on the FIGURE as resistance 20 in series with the individual magnet 2. The result of the resistance 20 appearing is that a voltage above the pre-determined detection voltage of monitor 15 will occur across the magnet 2. In response thereto, the monitoring device 15, which as noted can comprise a diode arrangement such as those known in the prior art, will provide an output to open switch 9. Switch 9 as well as the remainder of the switches to be described below, can be a vacuum contactor, air contactor or power curcuit breaker of the type having a short switching time, for example, 50 miliseconds. The signal developed within the monitoring device 15 can of course be amplified in conventional fashion in order to operate one of these types of devices. The switch 9 is coupled to each of the monitors 15, 16 and 17 so that should a normal conducting condition be detected across any individual coil the switch 9 will be open to disconnect power supply 5. The monitoring device 15 is coupled via a line 25 to control unit 24. As indicated by the double arrows, this line 25 represents the transmission of signals in both directions.

The purpose of control unit 24 is that of a timing and logic function to open the proper ones of switches 6, 7, 8 and 13 in the proper order. The same output used in opening the switch 9 will be provided over line 25 to control unit 24. In response thereto, control unit 24 will output a signal on the lines 25, 26 and 27 to each of the monitors commanding the opening of switches 6, 7 and 8 to isolate and de-energize each of the individual magnets 2, 3 and 4. If the switches 14 are installed, the control unit output may also be used to provide a command to close the switches 14 to couple each of the individual magnets 2, 3 and 4 to ground at their center tap. As a result, the potential at the terminals of the individual magnets with respect to ground can thereby be cut in half. Thus, the dielectric strength of the windings is increased accordingly. This particular function of control unit 24 will be recognized by those skilled in the art as an O-ring function. That is, if either monitoring device 15, monitoring device 16 or monitoring device 17 provides an output indicating normal conduction, control unit 24 must provide an output on the lines 25, 26 and 27 to open the switches 6, 7 and 8, and if installed, to close the switches 14. Such a function may be implemented using relay or semiconductor logic in well known fashion. As with the operation of the switch 9, appropriate amplifying devices may be employed to provide proper switching inputs to the switches 6, 7, 8 and 14, which as noted above, can be vacuum contactors, air contactors or power circuit breakers.

The switches 13 in series with the low resistance shunts 11 are provided so that de-energization of the individual magnets can be speeded up. The opening of the switch 13 associated with any of the individual magnets will result in only the resistance 12 then being shunted across the magnet. As noted above, this is a high resistance and will result in faster de-energization. To prevent overheating, the individual magnet which has gone into normal conduction must of course, be quickly de-energized. This will of course result in asymetrical magnet forces on a toroidal arrangement. Thus, to oppose these forces, other magnets may be similarly quickly de-energized to maintain proper balance, i.e., the magnet opposite the magnet which has become normal conducting in the toroidal arrangement can also be quickly de-energized to provide an opposing force to maintain the balance in the system. This is an additional function of the control unit 24. Thus, in response to the output from the monitoring device 15, control unit 24 will also output an output signal commanding the opening of switch 13 so that the de-energization of magnet 2 takes place as quickly as possible. The control unit 24 will also be programmed, depending on the particular magnet arrangement, to open the switches 13 associated with one or more of the other magnets to maintain the proper force distribution. Again, such a function is well within the capability of those skilled in the art and may be constructed using well known semiconductors or relay logic.

Thus, in response to an output from monitoring device 15, the switch 9 will be immediately opened and a signal sent to the control unit 24 whereupon it will command opening of the switches 6, 7 and 8 and closing of the switches 14 when installed. Control unit 24 will then also command the opening of the switch 13 associated with the individual magnet 2 and also any other switches 13 required to maintain proper forces within the magnet arrangement.

The values of the resistors 11 and 12 determine the maximum voltage values at the contacts of the switch 9 and at the terminals of the magnets 2, 3 and 4. If the switch 9 is opened after a quench of one of the individual magnets, for example, the individual magnet 2, a maximum voltage $U_{9max} = n \cdot J_o(R_{11} \cdot R_{12})/(R_{11} + R_{12})$ will appear at the switch 9. In this equation $n$ is the number of individual magnets, $J_o$ the current flowing within the system at the time of the opening of switch 9 and $R_{11}$ and $R_{12}$ the respective resistances of resistors 11 and 12. That is, the voltage will be the sum of the voltages across each of the individual magnets, assuming that each individual magnet is in a normal conducting state with current flowing through its shunt. Since resistance $R_{11}$ of the resistor 11 is much smaller than the resistance $R_{12}$ of resistor 12, this voltage will be determined primarily by the value of the resistance $R_{11}$. The maximum voltage $U_{2max}$ across the terminals of an individual magnet, however, will be determined primarily by the resistance $R_{12}$. With the switches 6, 7, 8 and 9 open along with the switch 13 at an individual magnet, the voltage across that magnet will be $U_{2max} = J_o \cdot R_{12}$. In most cases it will be desired to limit the maximum permissible voltage in the system to a predetermined value e.g. 1,000 volts. Thus, knowing the current in the system, i.e., $J_o$ and $U_{2max}$, the value $R_{12}$ of resistor 12 can thereby be established. To limit the voltage $U_{9max}$ at the switch 9 to the same value, the value $R_{11}$ must equal the value $R_{12}$ divided by ($n - 1$). Thus, the resistance values of the two resistors 11 and 12 may be established and are limited to these values by the maximum permissible voltage values within the system.

Although the illustrated embodiment is shown with a high resistance resistor 12 and a switched low resistance resistor 11 shunted across the magnet, other resistance arrangements may also be used for de-energization. For example, resistors in series across the magnet, one having a low resistance and the other having a high resistance with a shorting switch across the high resistor can also be used. In that case, the switch across the high resistance would normally be closed and only opened for fast de-energization when it was desired to have the high resistance in the circuit. Furthermore, shunts having more than two resistance values can be provided for each individual magnet and the resistance values control continuously according to a predetermined program. However, the resistance value must be selected to meet the force requirements within the magnet system and the required de-energization speeds. In addition, the grounding of the individual magnets 2, 3 and 4 by the switches 14 can be done at other than the center tabs of the windings. For example, these switches may be placed at one or the other ends of the individual magnets 2, 3 and 4.

Also shown on the FIGURE is a shunt 21 across the switch 9 and power supply 5. This comprises a rectifier or diode 23 in series with a switch 22 which is normally open. This switch 22 may be interlocked with the switch 9 so that when the switch 9 is open the switch 22 will close. This permits de-energizing the entire superconducting magnet system slowly when the whole system is in the superconducting state. In addition, the process of de-energization under normal conditions may also be controlled in time through the use of the resistor 19 connected in series with the resistor 18. In this case, the voltage at the switch 22 may be kept smaller than the maximum voltage which appears at the switch 9 in the event of a quench of one of the individual magnets 2 to 4.

The system of the present invention can be typically used in a toroidal arrangement designated as a Stellerator which is well known in plasma technology. This type system is used for the containment or thermal insulation of hot gases. The arrangement of the present invention may be coupled to such a Stellerator which will comprise, for example, 40 individual magnets each having an inductance of 4.2 H. The parallel resistors 11 and 12 will have resistances $R_{11}$ and $R_{12}$ respectively of 0.037 and 1.43 ohms for an operating current $J_o$ of, for example, 700 A with a voltage limitation of 1,000 volts. In such an arrangement, the operating current flowing through the individual magnets will decay during de-energization to approximately $1/e$ in about 3 seconds. Thus, the energy stored in the individual magnets is converted into heat outside the cyrostat system through the resistors 11 and 12. Because of the isolation of the individual magnets thtough the switches 6, 7, 8, the whole magnet system does not become normally conducting and only those magnets which have so become needed, be recooled down thus, reducing the amount of additional cooling required. In large systems, in order to reduce the number of required components, the switches and/or monitoring arrangements of the present invention can be reduced by combining two or more individual magnets in one unit. These and other modifications may be made without departing from the spirit of the invention which is intended to be limited solely by the appended claims.

What is claimed is:

1. In a superconducting magnet system wherein a plurality of individual magnets are connected in series and the series combination supplied by a common power supply through a first switch, each individual magnet having associated therewith a superconductivity monitoring device and a plurality of resistors for de-energization, said first switch being adapted to open in response to any one of said monitoring devices providing an output indicating normal conduction in its individual magnet, means to provide improved operation of the system during a quench condition comprising:
   a. a plurality of switches, one being installed in each line connecting an individual magnet with another individual magnet; and
   b. means responsive to an output from any of the monitoring devices to open all of said plurality of switches.

2. The invention according to claim 1 wherein each of said individual magnets is placed in a separate cyrostat.

3. The invention according to claim 1 and further including a second plurality of switches, one being provided for each of said individual magnets coupling said magnets to ground when closed, said switches being normally open and responsive to said means for closing said first plurality of switches to close when said first plurality of switches are open.

4. The invention according to claim 1 wherein the resistances associated with each magnet comprise a shunt across the magnet comprised of the plurality of resistors and further including at least oe switch coupled to said plurality of resistors for changing the shunt resistance.

5. The invention according to claim 4 wherein said shunt comprises a high resistance resistor, and a low resistance resistor parallel thereto with said switch coupling one terminal of said first and second resistances whereby said second resistance may be removed from the shunt.

6. The invention according to claim 4 wherein said shunt comprises a high resistance in series with a low resistance and wherein said switch is placed across said high resistance.

7. The invention according to claim 5 wherein the resistance of said high resistance resistor is smaller than or equal to the ratio of the maximum permissible voltage at an individual magnet to its operating current.

8. The invention according to claim 7 wherein said system comprises n individual magnets and wherein the resistance of said second resistor is smaller than or equal to the $(n-1)$th part of the resistance of said first resistor.

9. A method of operating an arrangement for removing the energy from a superconducting magnet system wherein a plurality of individual magnets are connected in series and the series combination supplied by a common power supply through a first switch, each individual magnet having associated therewith a superconductivity monitoring device and a plurality of resistors for de-energization, said first switch being adapted to open in response to any one of said monitoring devices providing an output indicating normal conduction in its individual magnet, in response to an output from any one monitoring device comprising the steps of:
   a. disconnecting the power supply from the series magnet circuit.
   b. isolating each of the individual magnets from each other;
   c. grounding each of said individual magnets; and
   d. increasing the shunt resistance in at least the magnet whose monitoring device has provided an output.

10. The invention according to claim 9 and further including the step of increasing the resistance in other individual magnet shunts in order to maintain a force balance within the magnet arrangement.

* * * * *